(12) United States Patent
Chandhoke

(10) Patent No.: US 8,250,343 B2
(45) Date of Patent: Aug. 21, 2012

(54) AXIAL MOTION CONTROL PROCESSING BY MULTIPLE CORES RESPECTIVELY EXECUTING EACH OF A SEQUENCE OF FUNCTIONS IN PARALLEL FOR RESPECTIVE PORTIONS OF A MOTION SYSTEM

(75) Inventor: Sundeep Chandhoke, Austin, TX (US)

(73) Assignee: National Instruments Corporation, Austin, TX (US)

( * ) Notice: Subject to any disclaimer, the term of this patent is extended or adjusted under 35 U.S.C. 154(b) by 487 days.

(21) Appl. No.: 12/506,832

(22) Filed: Jul. 21, 2009

(65) Prior Publication Data
US 2011/0022822 A1  Jan. 27, 2011

(51) Int. Cl.
G06F 15/16  (2006.01)
G05B 19/04  (2006.01)
(52) U.S. Cl. ................................... 712/36; 700/249
(58) Field of Classification Search .................. None
See application file for complete search history.

(56) References Cited

U.S. PATENT DOCUMENTS

| 4,803,613 | A * | 2/1989 | Kametani et al. ................ 700/3 |
| 5,550,875 | A | 8/1996 | Bennett |
| 7,168,748 | B2 * | 1/2007 | Townsend et al. ............ 294/106 |
| 7,593,779 | B2 * | 9/2009 | Hsieh et al. ..................... 700/2 |
| 7,979,160 | B2 * | 7/2011 | Teaford et al. ................ 700/254 |
| 2001/0020944 | A1 | 9/2001 | Brown et al. |
| 2001/0032268 | A1 | 10/2001 | Brown et al. |
| 2002/0045956 | A1 | 4/2002 | Kapitan |
| 2002/0110155 | A1 | 8/2002 | Pearce et al. |
| 2003/0177161 | A1 * | 9/2003 | Rothschild ..................... 709/100 |
| 2003/0220715 | A1 | 11/2003 | Kneifel et al. |
| 2004/0002778 | A1 | 1/2004 | Giamona et al. |

OTHER PUBLICATIONS

Stephen J. Mraz; "FireWire Jumps from Consumer Applications to Factory Automation"; Apr. 3, 2003; 6 pages; Obtained from Internet: <http://machinedesign.com/article/firewire-jumps-from-consumer-applications-to-factory-automation-0403>.
"ServoWire Soft Motion Low Power Drives"; ORMEC; Sep. 9, 2003; 5 pages.
"Soft Motion Architecture Eliminates Motion Boards"; ORMEC; Sep. 9, 2003; 7 pages.
Dan D'Aquila; "Motion's Digital Future"; Motion Control Online; May 24, 2001; 5 pages; Obtained from Internet: <http://www.isa.org/Content/ContentGroups/Motion_Control2/Features1/20011/2001_June1/Motions_Digital_Future/Motions_Digital_Future.htm>.

* cited by examiner

*Primary Examiner* — Kenneth Kim
(74) *Attorney, Agent, or Firm* — Meyertons Hood Kivlin Kowert & Goetzel, P.C.; Jeffrey C. Hood; Joel L. Stevens

(57) ABSTRACT

Controlling a motion system using a plurality of processors. First input data may be received which corresponds to a first portion of the motion system. Second input data may be received which corresponds to a second portion of the motion system. Execution of a first function of a plurality of sequential functions may be assigned to a first processor to determine output for the first portion based on the first input data. Execution of the first function may be assigned to a second processor to determine output for the second portion based on the second input data. The first processor executing the first function and the second processor executing the first function may be performed in parallel. The output for the first portion of the motion system may be provided to the first portion. The output for the second portion of the motion system may be provided to the second portion.

20 Claims, 7 Drawing Sheets

AXIAL MOTION CONTROL PROCESSING BY MULTIPLE CORES RESPECTIVELY EXECUTING EACH OF A SEQUENCE OF FUNCTIONS IN PARALLEL FOR RESPECTIVE PORTIONS OF A MOTION SYSTEM

FIELD OF THE INVENTION

The present invention relates to the field of programmable controllers, and more particularly to a programmable controller that uses a plurality of processors.

DESCRIPTION OF THE RELATED ART

In recent years, motion controllers have become central for controlling many aspects of industrial testing, production, and operations, e.g., as part of control, measurement, and automation systems. However, similar to most electronic systems, both users and developers desire for motion controllers and motion systems to operate in a faster and more efficient manner for these applications. Thus, improved systems and methods for developing motion control applications are desirable.

SUMMARY OF THE INVENTION

Various embodiments of a system and method for controlling a motion system using a plurality of processors.

First input data corresponding to a first portion of the motion system may be received. For example, the first portion of the motion system may be a device, such as a drive, and the first input data may be received from the device. The input data may indicate current status information, such as position, velocity, and/or acceleration information, drive state information, etc.

Similarly, second input data corresponding to a second portion of the motion system may be received.

Execution of a first function of a plurality of sequential functions may be assigned to a first processor to determine output for the first portion of the motion system based on the first input data. The first processor may be a processing chip or may be a core of a processing chip, as desired.

Similarly, execution of the first function of the plurality of sequential functions may be assigned to a second processor to determine output for the second portion based on the second input data.

The first processor executing the first function of the plurality of sequential functions and the second processor executing the first function of the plurality of sequential functions are performed in parallel. Thus, the first processor executing the first function and the second processor executing the first processor are performed, at least in part, at the same time.

The remainder of the plurality of sequential functions may be assigned to the first and second processors for the first and second portions, e.g., respectively. Similar to above, the remainder of the plurality of sequential functions may be executed by the first and second processors in a parallel fashion.

The plurality of sequential functions may be executed to determine new commands or output for the portion of the motion system. More specifically, in one embodiment, executing the first function may include utilizing a control axis for each of the first and second devices. Each control axis may include state information and algorithms used to perform the first function for the first and second devices, respectively.

The plurality of sequential functions may include a determination of state information of the respective portion to determine if there is an error. The sequential functions may also include generation of a trajectory for the respective device of the motion system. The plurality of sequential functions may further include generation of a setpoint based on the trajectory for the respective portion of the motion system. The output for the respective portion of the motion system may be based on the setpoint.

Upon completion of execution of the plurality of sequential functions, the output for the first portion of the motion system may be provided to the first portion. Similarly, the output for the second portion of the motion system may be provided to the second portion.

Thus, a plurality of processors operating in parallel may be used to control a motion system.

BRIEF DESCRIPTION OF THE DRAWINGS

A better understanding of the present invention can be obtained when the following detailed description of the preferred embodiment is considered in conjunction with the following drawings, in which.

Figure 1A:
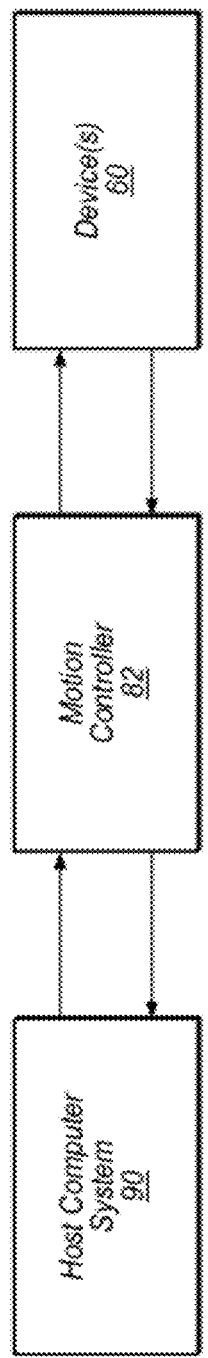
FIG. 1A illustrates a motion control system wherein the motion controller is coupled to a host computer system, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. application Ser. No. 11/338,922, titled "System and Method for Automatically Updating the Memory Map of a Programmable Logic Controller to Customized Hardware", filed Jan. 24, 2006.

U.S. application Ser. No. 11/427,052, titled "System and Method for Automatically Updating the Memory Map of a Programmable Controller to Customized Hardware," filed Jun. 28, 2006.

U.S. application Ser. No. 11/948,421, titled "Motion Controller That Supports Standard and Custom Axes," filed Nov. 30, 2007.

U.S. Publication No. 2009/0106755, titled "Programmable Controller with Multiple Processors Using Scanning and Data Acquisition Architectures," filed Oct. 19, 2007.

U.S. Publication No. 2009/0106761, titled "Programmable Controller with Multiple Processors Using a Scanning Architecture", filed Oct. 19, 2007.

TERMS

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may include other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may include two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE 7 from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others. A LabVIEW graphical program, may be referred to as a "virtual instrument" (VI).

The term "graphical program" includes models or block diagrams created in graphical modeling environments, wherein the model or block diagram includes interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning The term "Graphical User Interface" is often abbreviated to "GUI". A GUI may include only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may include a single window having one or more GUI Elements, or may include a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may include GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements include input controls and output indicators Input Control—a graphical user interface element for providing user input to a program. Exemplary input controls include dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Programmable Controller—programmable controllers may include programmable logic controllers (PLCs), programmable automation controllers (PACs), distributed control systems (DCSs), and/or other programmable controllers which utilize scanning architectures. A programmable controller may have its own processor(s) or may share a processor with a user application.

Task—A task may be included in a programmable controller and may itself include programs and variables, e.g., variables used by the programs. A task may define the schedule and/or manner in which the programs may be executed on the programmable controller, and may include a memory table that is updated before the execution of programs included in the task. For execution, the programs in the task may be assigned an execution order within the task, i.e., the order defines priority of program execution. Additionally, in a multitasking environment, each task may be assigned a specified priority with respect to the other tasks.

Axis—a logical grouping that includes the components used to control a system or device in a motion control system. For example, a motion control axis may include a motor (i.e., actuator), encoder (optionally), IO needed to control the motor effectively (limit switches, home sensors etc.), and control software (supervisory control, trajectory generation, position, velocity and current control loops) for the motor.

Programmable Controllers

The following describes embodiments of systems which utilize PLCs, PACs, and/or DCSs. Note that embodiments herein described with respect to PLCs may equally apply to embodiments with PACs and/or DCSs. In particular the embodiments may apply to those programmable controllers which implement scanning architectures, such as, for example, those described below. Note however, that the programmable controllers are not limited to those described herein, and that other programmable controllers are envisioned.

The term "programmable automation controller" is intended to capture the full breadth of its ordinary meaning and at least includes the characteristics described herein. In general, PACs combine the features of normal PLCs, such as those described above, with the capabilities of computer system control systems, e.g., using a personal computer. In some cases, PACs may provide a more open, modular programming environment than provided by normal PLCs. Additionally, such PACs may provide the protection and stability provided by PLCs that personal computing systems generally lack. For example, the PACs may include a ruggedized housing for protection from the local environment which can sometimes be quite corrosive. Additionally, the PACs may be generally more stable than personal computing systems simply due to the nature of current standard personal computing operating systems. Thus, in some embodiments, at least one PAC, e.g., using the scanning architecture described herein (e.g., with reference to FIG. 4), may be used in conjunction with the architectures, systems, and methods described herein.

Additionally, the term "distributed control system" (DCS) is also intended to capture the full breadth of its ordinary meaning and at least includes the characteristics described herein. In general, DCSs include one or more instruments or computing systems for implementing various processes, such as those described above in relation to the use of PLCs. Thus, similar to the above descriptions regarding PACs, one or more DCSs may be used in conjunction with the systems and methods described herein.

Figure 1B:
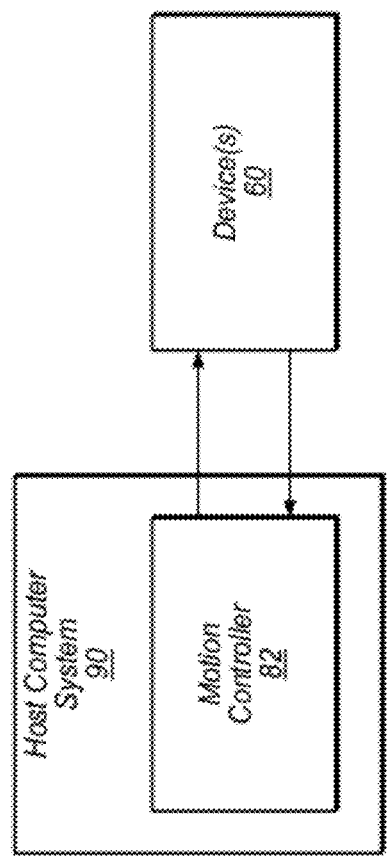
FIG. 1B illustrates a motion control system wherein the motion controller is implemented by a host computer system, according to one embodiment.

FIGS. 1A and 1B—Block Diagrams of Exemplary Motion Control Systems

FIGS. 1A and 1B are high level block diagrams of motion control systems, according to various embodiments. FIG. 1A illustrates a system where a host computer system 90 is communicatively coupled to a motion controller 82, which is in turn communicatively coupled to at least one device 60. The host computer system 90 may store a development environment for developing user motion control programs, e.g., user application code and/or custom logic for a custom communication interface. For example, in one embodiment, the host computer system 90 may store a LabVIEW graphical program development environment, provided by National Instruments Corporation, although in other embodiments, any other development environments and programming languages may be used as desired. In some embodiments, these programs may then be provided, e.g., over a network, to the motion controller for execution. In other embodiments, the host computer system 90 may store and execute the user motion control programs, e.g., user applications and/or custom code in the communication interface.

The controller 82 may be coupled to the host computer system 90 via a network or a computer bus using any of various networks and protocols described above, among others. The computer system 90 may be any of various types, as desired. In some embodiments, a program executing on the computer system 90 may provide a human-machine interface (HMI) for the controller. For example, the program may be an HMI application executing on the host computer, and facilitating user interaction with the controller. In this embodiment, the program may receive input from a user on host computer system 90 with regard to instructions for the controller, which may then provide input to the controller accordingly. In some embodiments, the instructions may also be directed toward, and subsequently provided to, a programmable hardware element (PHE) which may provide the hardware interface between the device(s) 60 and the controller.

In some embodiments, user programs, e.g., application and custom graphical programs, may execute in a distributed fashion. For example, with respect to a user application, at least one portion of the program, e.g., at least one portion of a block diagram of the program, may be implemented and/or executed on one or more PHEs coupled to the controller and another portion, e.g., another portion of the block diagram, may be implemented and/or executed on the controller. In one embodiment, one portion, e.g., the program's GUI, of the program may be executed on the host computer system 90 coupled to the controller 82. More specifically, in one embodiment, a portion of the graphical program may execute on the controller (e.g., the controller may be configured according to the portion of the graphical program) and another portion of the graphical program (e.g., including the front panel of the graphical program) may execute (e.g., concurrent to execution of the graphical program portion on the controller) on the computer system 90, e.g., to provide an MMI for the graphical program portion executing on the controller.

In further embodiments, the controller may be a "soft" controller, i.e., a computer program running on a computer system such as host computer system 90 that mimics the operation of a standard PLC or PAC (or controller). For example, the computer program may be a graphical program, such as a LabVIEW graphical program, and may operate to perform all the functionality of controllers described herein. FIG. 1B illustrates an embodiment where the host computer system 90 is or includes the motion controller 82. In other words, the various functionalities described above with respect to the host computer system 90 and the motion controller 82 may be performed by a single computer system, specifically, the host computer system.

Note that in preferred embodiments, the motion control system described herein includes a PLC or PAC with integrated motion control, and may be referred to generically as a programmable controller, or simply a controller.

Figure 2:
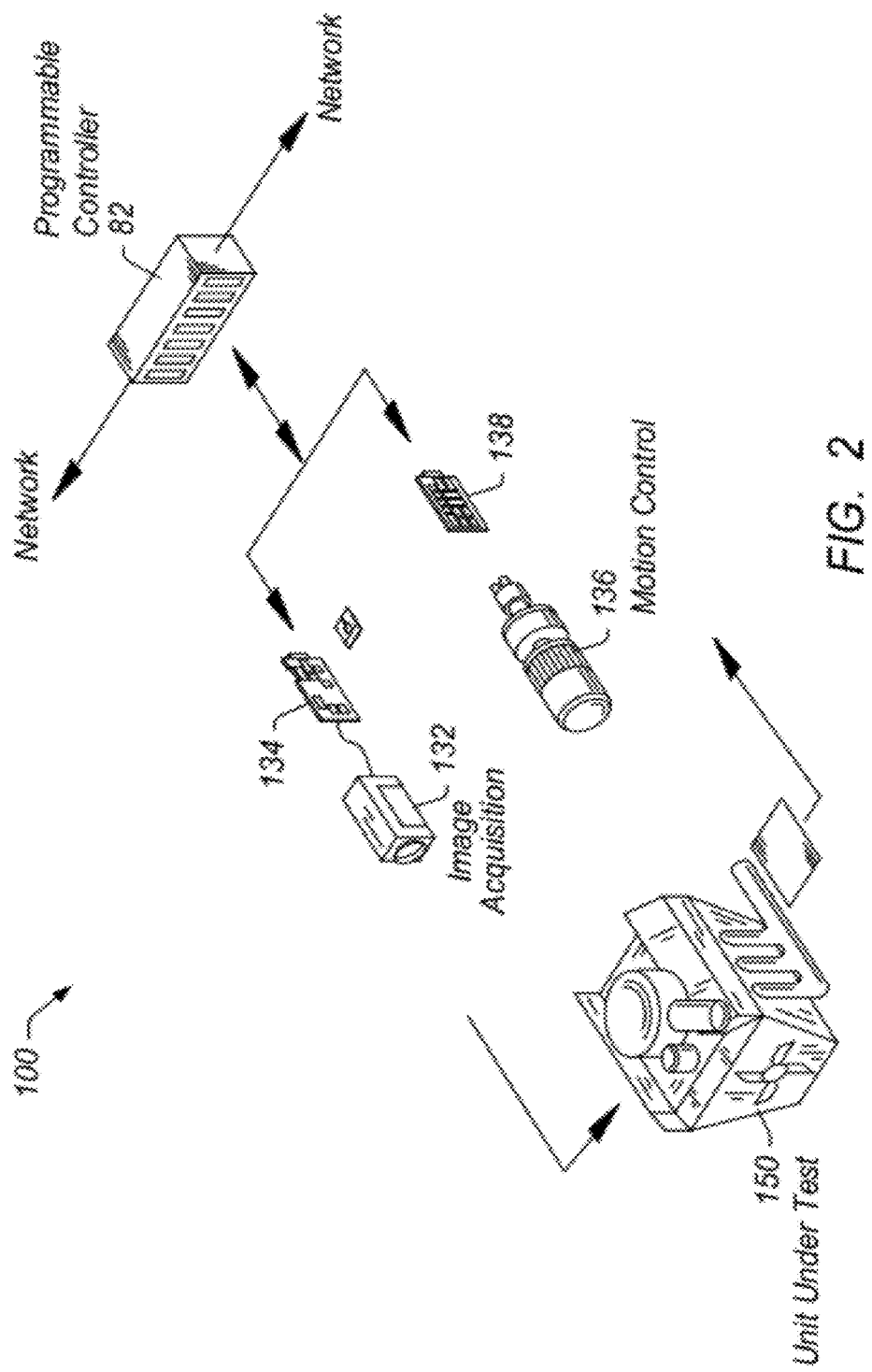
FIG. 2 illustrates a motion control system, according to one embodiment.

FIG. 2—Exemplary Motion Control System

FIG. 2 illustrates an exemplary motion control system 100 using a dedicated programmable controller, according to one embodiment. As FIG. 2 indicates, in this embodiment, the programmable controller 82, referred to as the controller, couples to a motion control device 136 via an associated motion control interface card 138, as well as to a data acquisition device, specifically, an image acquisition device 132, via an associated image acquisition interface card 134. The motion control device 136 interacts with or controls a unit under test (UUT) 150, which may any type device or component desired.

The controller may include one or more processors as well as a memory medium(s) coupled to the processor(s) on which one or more computer programs or software components may be stored. As used herein, "processors" may include processor cores or processing chips. For example, a programmable controller with multiple processors may include a single processing chip with multiple cores (e.g., 2, 4, 8, etc.) or may include multiple processing chips (e.g., multiple central processing units), where each processing chip includes one or more processors. Multiple processors may refer to any combination of chips and cores. The memory medium may store one or more programs which are executable to perform the methods described herein. In some embodiments, the programs may include graphical programs. Various embodiments further include receiving or storing instructions and/or data implemented in accordance with the foregoing description upon a carrier medium.

As indicated above, the controller may be coupled to one or more devices, e.g., device(s) 60 of FIGS. 1A and 1B, e.g., motion control device 136. In some embodiments, the devices may be coupled directly to the controller via an electrical interface. In other embodiments, the device(s) may also be coupled to the controller via an intermediary device, e.g., another controller, a PHE, or other suitable devices. In another embodiment, the devices may be implemented at a remote location and may be coupled to the controller via a network, e.g., LAN, WAN, Internet, Intranet, etc. In one embodiment, the controller may communicate directly with the one or more devices, or, alternatively, an intermediary device may provide a network communication interface between the controller and the remote devices. In various embodiments, the controller may communicate with the remote devices directly, or via an intermediary device, using any of a variety of communication protocols, e.g., TCP/IP, GPIB, Ethernet (e.g., CSMA/CD), Local Talk (e.g., CSMA/CA), Token Ring, FDDI, ATM, NetBEUI, IPX/SPX, IPv6, CANopen, DeviceNet, PROFInet, EtherNet/IP, EtherCAT, Ethernet Powerlink, SERCOS, or other suitable communication protocols.

In some embodiments, the controller may be included in or coupled to a chassis. In various embodiments, the chassis may include one or more module expansion slots operable to receive expansion modules. The expansion slots may be operable to receive any of a variety of expansion modules, including, PCI, PCI Express, ISA, PXI, VXI, GPIB, or other suitable form factors and/or card types. The expansion modules may be coupled to and may communicate with the controller via a backplane. For example, the backplane may include the programmable hardware element, e.g., the FPGA, which may operate to provide input and output to the controller from one or more devices included in or coupled to the chassis, e.g., the expansion modules plugged into the expansion slots or other devices coupled to the chassis. Additionally, in various embodiments, the backplane may implement any of a variety of buses, including, but not limited to, a VXI (VME eXtensions for Instrumentation) bus, a GPIB (General Purpose Interface Bus) bus, a PXI (PCI eXtensions for Instrumentation) bus, a CAN bus, a Profibus bus, a serial bus, a parallel bus, or other suitable buses. In some embodiments, where the backplane includes or is a PHE, a user may be able to program the PHE such that the backplane performs operations on the input and output from the controller and/or the devices coupled to the chassis.

Figure 3:
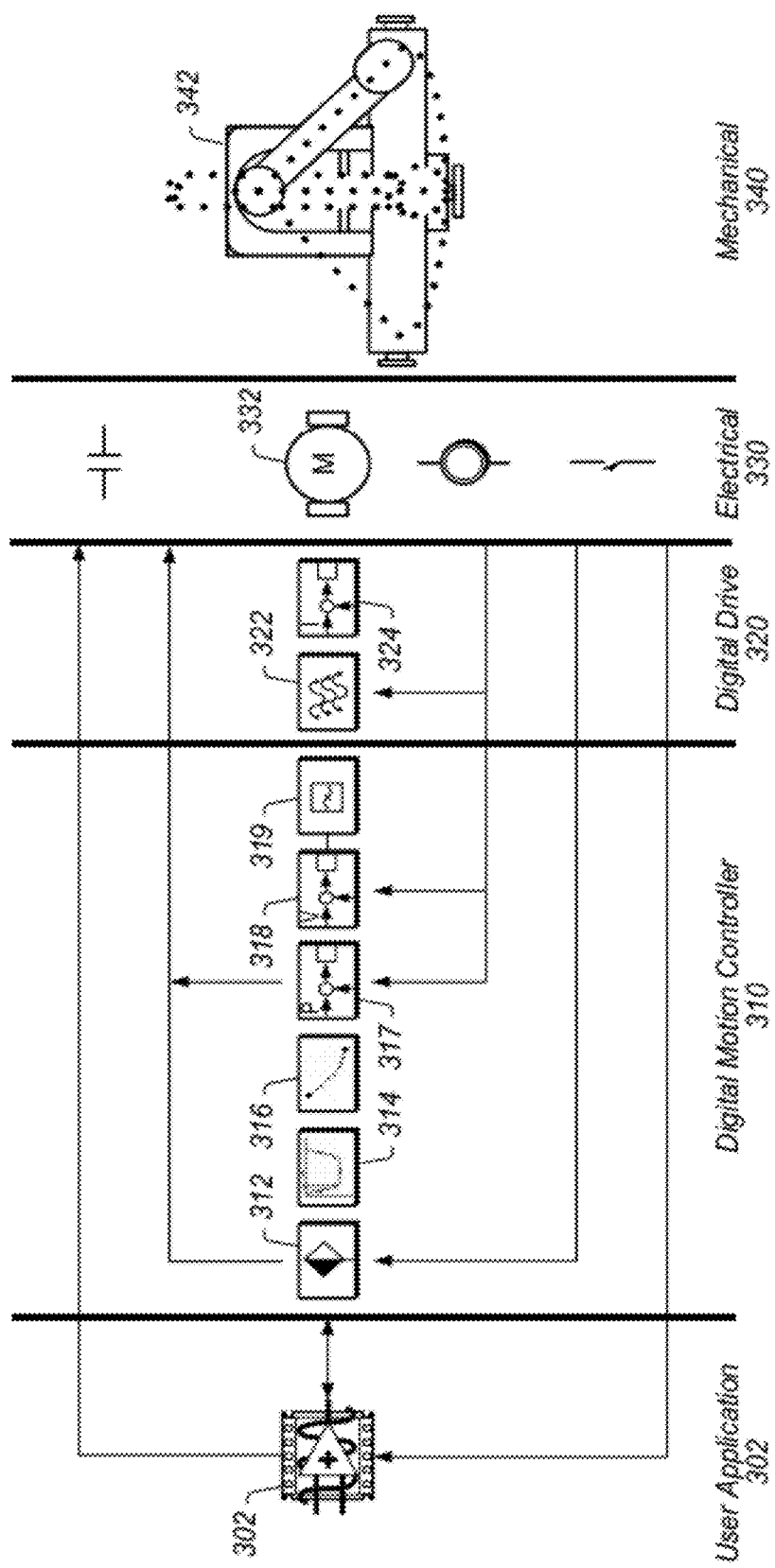
FIG. 3 illustrates a motion control system that is connected to an exemplary motion drive, according to one embodiment.

FIG. 3—Motion Control System Components

FIG. 3 illustrates various components of an exemplary motion control system that is connected to a torque based motion drive. In this embodiment, the drive may be performing the commutation and current loop control in addition to the amplification of the command signals coming from the motion controller. However, the configuration may be different, such that the drive is closing the position and velocity control loops additionally, which would make the drive a "position based drive". In this case, the motion controller may only perform supervisory control and trajectory generation functions described below. In another embodiment, the motion controller may be embedded inside the drive and perform all of the described functions. Thus, in embodiments described herein, the motion controller and/or the drive may be implemented with multiple processors (e.g., multiple processing chips and/or multiple cores), and the processors may provide motion control as described herein.

This particular system is organized into five portions: a user application 302, a motion controller (software and/or hardware) 310, a drive 320, electrical components 330, and mechanical components 340.

Figure 4:
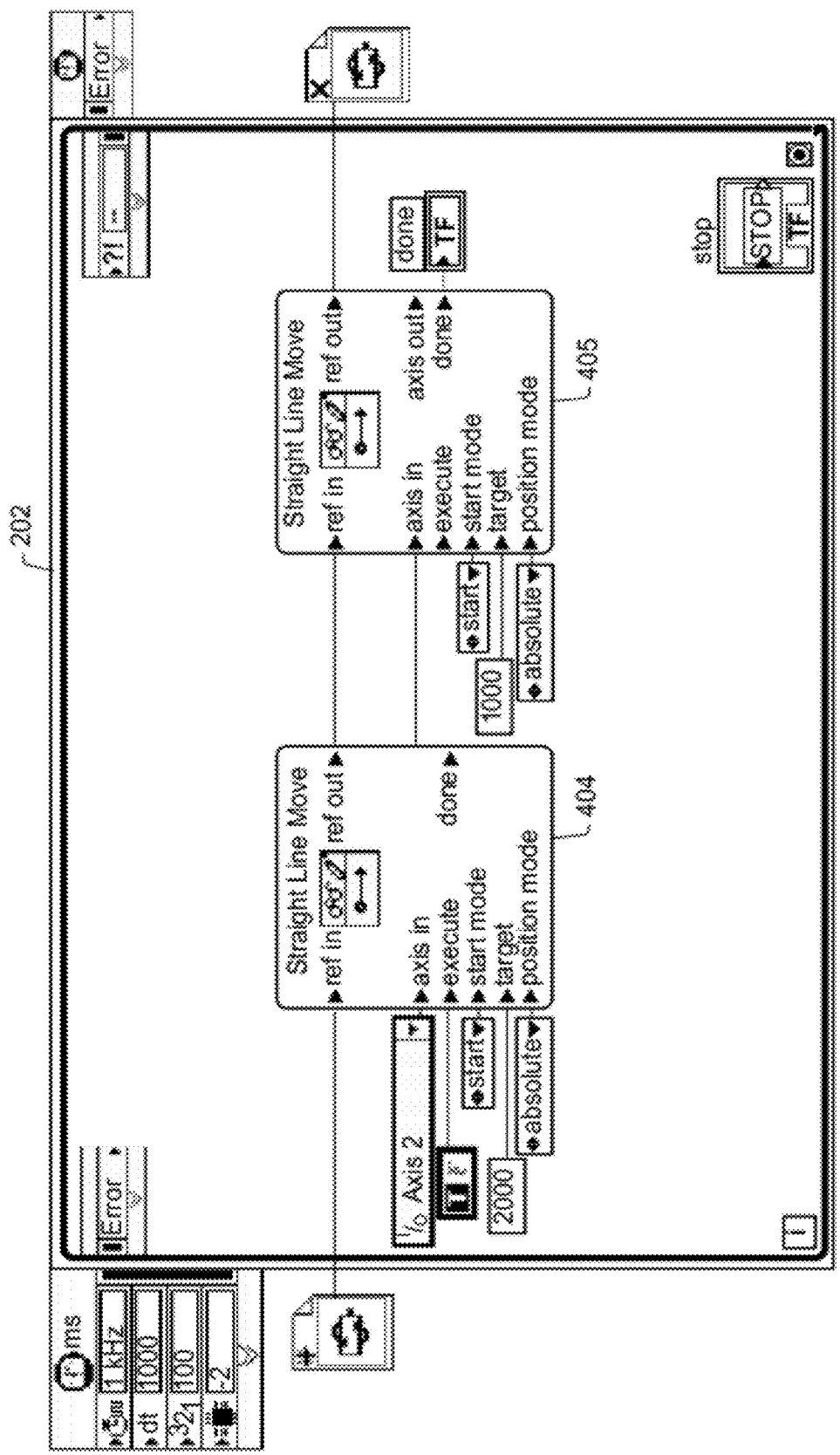
FIG. 4 illustrates an exemplary graphical program that may be used to control a motion system, according to one embodiment.

An example of the user application 302 is shown in FIG. 4. As shown, this exemplary user application 400 includes a plurality of interconnected graphical program nodes that visually represent functionality of the program, and whose nodes are executable to perform this functionality. As may be seen, the graphical program of FIG. 4 includes various nodes. For example, nodes 404 and 405 respectively represent or specify two sequential straight line move operations. Note that these nodes are both located within a loop node 412 that specifies iterative execution of graphical program elements contained within the loop.

As shown, the motion controller 310 includes a supervisory control component 312, a trajectory generator 314, an interpolator 316, control loops 317 and 318, and filter(s) 319. The motion system may perform the following functions, e.g., for each device or axis of the motion controller, as described in more detail below.

The motion controller may initially read the data from the drives and sensors. This may involve reading all of the I/O data from the drives connected to the motion controller. The data may include position, velocity, limit switch states and/or other ancillary inputs like analog sensors to detect force, etc.

Next, event management may be performed (which may be included as a part of supervisory control, e.g., performed by supervisory control component 312). During this portion, the input data may be used by the motion controller to check the state of the drive. This may include communication watchdog, e-stop activation, limit switch states, drive faults, etc. Each drive may need to be checked and the internal state corresponding to each drive may be updated in the memory of the motion controller. A limit switch may be used to commands the trajectory generator 314 to stop, if a limit is encountered. Similarly, other error conditions or faults may be dealt with during event management. Other supervisory control functions may also be included as desired.

Trajectory generation (e.g., performed by trajectory generator 314) may be performed based on motion request(s) from the user application 302 and the state of drives updated by the event management/supervisory control component 312. During trajectory generation, new setpoints for the drives may be calculated as part of the path planning. These setpoints may then be updated in internal memory so that they can be used by the control loop technology component or passed directly to the drives (e.g., in the case where the drives are implementing some of the functionality) when the outputs are written.

Following trajectory generation, gearing and electronic camming calculations may be performed (e.g., by supervisory control component 312). As one example, following an external sensor (encoder) may be a typical use case for a motion controller. The sensor (e.g., similar to a position encoder) may be read when data from the drives is updated. A new setpoint may be calculated based on user specified gear ratios or algorithms and updated in internal memory to be consumed by the control loops or passed to the drives (e.g., in the case they are implementing some of the functionality) when the outputs are written.

More specifically, electronic gearing may include monitoring a feedback device such as the encoder above and slaving the command output for an axis to it, applying specified ratios and offsets. This may be useful in a lot of packaging applications, where an axis is required to be synchronized to an external unit such as a conveyor or web. Camming may use the electronic gearing feature to smoothly change gear ratios based on specified position intervals in table/buffer.

Once the setpoint is determined (e.g., directly from trajectory generation or after gearing and camming calculations) control loop calculation may be performed. This may include position loop, velocity loop, filters, current loop and commutation calculations (e.g., performed by interpolator 316, control loops 317 and 318, and/or filter(s) 319). During this function, the setpoint may be used for each axis or device being controlled by the motion system to determine a drive command. The drive command may be filtered and commutated based on the configuration and type of motor or system being controlled. The setpoints from trajectory generation and gearing are typically combined before being consumed by the control loop. For example, in the case of a stepper motor, the control loops and filters may be replaced by step generation functions.

Finally, once the drive output is determined it may be provided to the device being controlled, which in this case, is a motor. Note that the above described functions provide only a nonlimiting example of the sequence of functions that may be performed for the motion system (e.g., each axis or portion of the motion system). However, it should be noted that typical motion system functions, such as those described above, include dependencies on data produced by each previous function, and therefore are typically executed in a sequential manner. Thus, as is clear from the above sequence of functions, data produced by one function is consumed by the next. However, these functions may be performed each axis or device of the motion system independently from each other axis or device of the motion system. Alternatively, even when multiple components or axes are combined to form a coordinate space, the sequence of functions may be performed independently for each different coordinate space.

In one embodiment, each function described above may be given full access to the available processors when it is time for it to execute. Each function may then use the processors to parallelize execution among each different axis or motion component before giving control to the next function. However, in some embodiments, the sequence of functions for each different axis or portion of the control system may be assigned to a processor to parallelize the execution, thereby not requiring each function to finish for all of the axes or portions at the same time. Thus, as described herein, the sequence of functions may be performed in parallel for each different component or axis of the motion system.

As FIG. 3 also shows, in this example system, the drive 320 includes a commutation component 322 for controlling the direction of current, e.g., to manage phase of a control current with respect to a motor, and a current loop component 324 that operates to control the current. The electrical components 330 include any of various electrical devices or components that the drive utilizes to control the motion, e.g., motors, such as motor 332, switches, sensors, etc. Similarly, the mechanical components 340 include any of various mechanical devices or components 342 used to control the motion, e.g., motion stages, hydraulics, mechanical switches, etc. It should be noted, however, that in other motion control systems, some of these components may be grouped differently, e.g., the control loops and/or filter(s) may be implemented in the drive, and so forth, as desired.

Note that in this typical motion control system, the drive closes the current loop and implements commutation, in which case the drive is called a torque or current amplifier. Optionally the drive can also close the velocity loop, in which case it is called a velocity amplifier. Finally, in cases where the drive closes both the position and velocity loops, the drive is referred to as a position amplifier. In all cases, however, the motion controller has responsibility for path planning (trajectory generation) and supervisory control. Note that the communication interface (not shown in FIG. 3) handles data transfer between the drive (based on its type) and any additional IO connected to the system. This communication interface can use a serial deterministic bus such as Controller Area Network (CAN) or SERCOS (Serial Realtime Communication System), or analog connectivity to an analog amplifier using analog and digital signals, among others, as desired.

Figure 5:
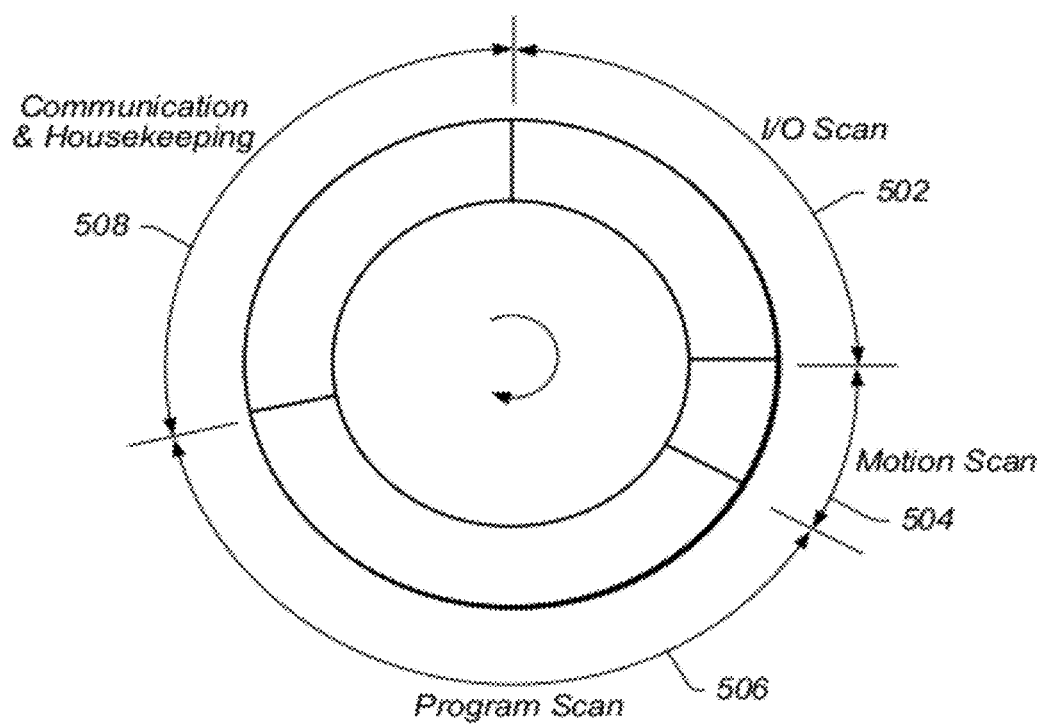
FIG. 5 illustrates an exemplary scanning cycle, according to the prior art.

FIG. 5—Scanning Architecture

A scanning architecture motion control system (such as control systems described herein) has a scan cycle during which various operations are performed. FIG. 5 illustrates an exemplary scanning cycle for a motion control system. As may be seen, each cycle includes an I/O scan 502, a motion scan 504, a program scan 506, and communication/housekeeping 508. The scan diagram of FIG. 5 is a typical model of execution of a PLC (programmable logic controller) with integrated motion (i.e., a PLC whose processor is shared with a motion controller). Typically, the I/O scan involves receiving (or exchanging) I/O data with various devices or components, such as sensors, that provide real world data regarding the unit or system being controlled, e.g., the current position/velocity of a motion platform, mechanical arm, etc. The motion scan has the highest priority and runs after the IO in the controller has been updated. The user defined programs run in the program scan portion. Note that in a dedicated motion controller the program scan is optional. Generally, the motion controller runs its logic, e.g., supervisory control, trajectory generation, and the control loops (optionally), during the motion scan period when the controller scans every cycle. The communication/housekeeping portion of the scan cycle relates to other processes, such as GUI functionality, logging, system self-monitoring, diagnostics, etc., e.g., ongoing maintenance and infrastructure operations.

Note that while a scanning architecture is described herein, the motion controller may implement any of various different architectures, such as an event based architecture. Thus, the use of multiple processors to control a motion system (as described herein) may not be limited to any particular architecture.

Figure 6:
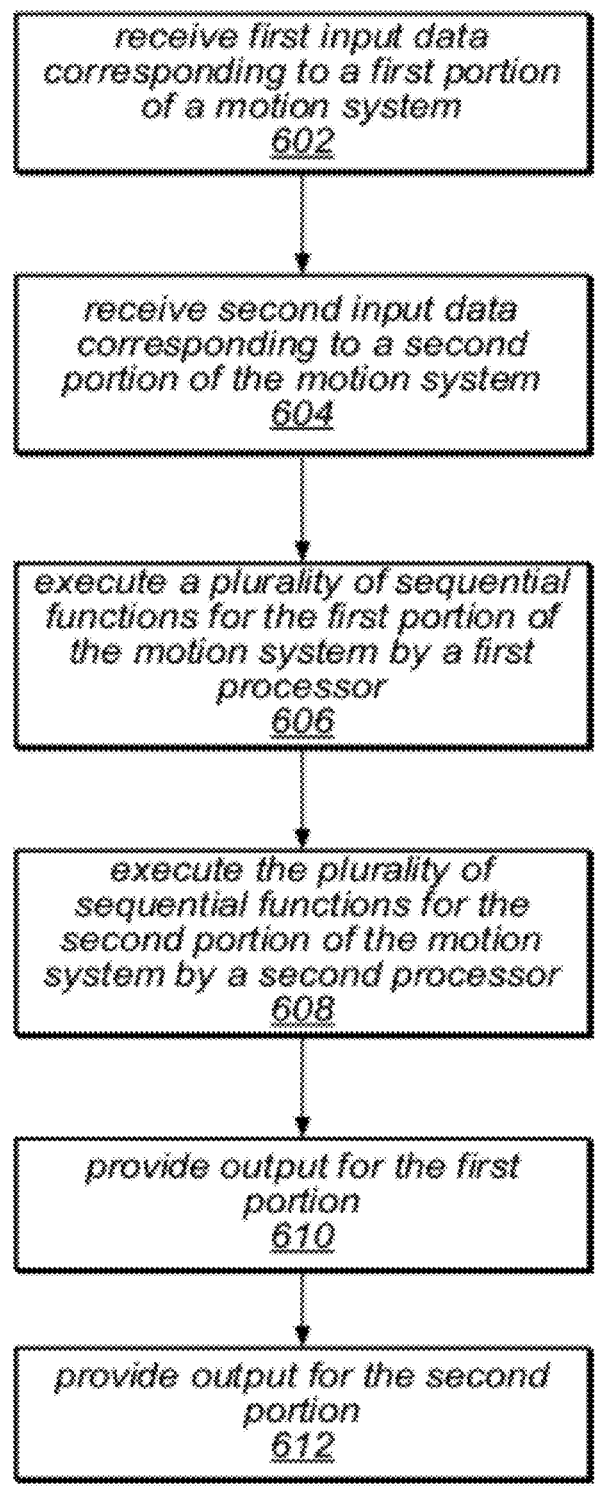
FIG. 6 is a high-level flowchart of a method for controlling a motion control system using a plurality of processors, according to one embodiment.

FIG. 6—Method for Controlling a Motion Control System

FIG. 6 is a high-level flowchart of a method for controlling a motion control system using a plurality of processors, according to one embodiment. In various embodiments, some of the method elements shown may be performed currently, in a different order than shown, or may be omitted. Additional method elements may be performed as desired. The method may be performed as follows:

In 602, first input data corresponding to a first portion of a motion system may be received. For example, current state information (e.g., current position, velocity, acceleration, status, error information such as limit switch states or drive faults, etc.) of the first portion of the motion system may be received. The first input data may also include other data such as analog sensor data, e.g., to detect force, etc. The first portion of the motion system may be or include a first device of the motion system, such as a motor, drive, robotic arm, etc. As described above, an "axis" of the motion system may refer to the software (e.g., algorithms) and state information used to control a portion of the motion system. Correspondingly, a first axis may be used to control the first portion of the motion system.

In some embodiments a first processor of the plurality of processors of the motion control system (e.g., the motion controller and/or drive) may be responsible for receiving and/or handling the first input data from the first portion of the motion system. In other words, in some embodiments, the first processor may be dedicated to the first portion (e.g., the first axis) of the motion system. However, the reading of data in 602 and 604 (and possibly for all of the portions of the motion system) may not be assigned to particular processors. As noted above, the term "processor" may refer to a core of a processing chip (e.g., in a multicore processing chip) or a processing chip, as desired.

In 604, second input data corresponding to a second portion of a motion system may be received. Similar to above, the second portion of the motion system may be a second device of the motion system. The second input data may be similar to the first input data above, but may be specific to the second portion of the motion system. Additionally, a second axis may be used to control the second portion of the motion system.

Similar to descriptions above, a second processor of the plurality of processors of the motion control system may be responsible for receiving and/or handling the second input data from the second portion of the motion system. Thus, the second processor may be dedicated to the second portion (e.g., the second axis) of the motion system.

In 606, a first processor may execute a plurality of sequential functions for the first portion of the motion system. In 608, a second processor may execute the plurality of sequential functions for the second portion of the motion system. The plurality of sequential functions may include those described above (e.g., event management, trajectory generation, gearing and camming calculation, and control loop calculation), although any number of variations and other possible functions are envisioned.

The first and second processors may execute the plurality of sequential functions concurrently or in a parallel fashion. As used herein, "concurrent" execution or execution in "parallel" refers to two different processors executing at the same time or in an overlapping fashion. For example, for at least a portion of the time when the first processor executes the plurality of sequential functions for the first portion of the motion system, the second processor also executes the plurality of sequential functions for the second portion of the motion system. The following describes various different methods for implementing this parallel processing.

In some embodiments, each function of the plurality of sequential functions may be performed at the same time for each of the portions of the motion system. For example, a first function of the plurality of sequential functions may have access to the available processors—in this example, both the first and the second processor. Thus, the first function may be performed for the first portion of the motion system by the first processor and the first function may also be performed for the second portion of the motion system by the second processor in a parallel fashion. In this embodiment, once the first function has been performed for both of the portions of the motion system, the second function may be performed for both of the portions of the motion system (where the first processor performs the second function for the first portion and the second processor performs the second function for the second portion). This operation may continue until all of the functions have been performed for both portions of the motion system. Thus, the plurality of sequential functions may be performed in a sequential, parallel fashion.

Alternatively, the plurality of functions may be performed for each portion of the motion system in an independent fashion. For example, the plurality of functions may be performed for the first portion of the motion system by the first processor without waiting for the second processor to finish corresponding function for the second portion of the motion system. Such operation may result in the first processor executing the second function of the plurality of functions while the second processor continues to execute the first function of the plurality of functions. Thus, the plurality of sequential functions may be performed in an independent, parallel fashion.

Note that the parallel execution of the sequential functions may be expanded to any number of processors and any number of portions of the motion system. In some embodiments, the number of portions of the motion system and the number of processors may be the same, such that each portion may be assigned to a corresponding processor. However, it may be possible that the number of portions may be different than the number of processors, and correspondingly, the processors may be load balanced such that they operate in an efficient manner to complete the plurality of functions for all of the portions of the motion system. For example, where there is one more portion of the motion system than processors, the additional portion may be assigned to a processor whose other assigned portion requires less computation than the other portions (e.g., the processor that finishes first). Other methods of load balancing among processors are envisioned.

In 610, output for the first portion of the motion system may be provided to the first portion. In 612, output for the second portion of the motion system may be provided to the second portion. The output to the first and second portions of the motion system may include commands or data usable to cause the first and second portions of the motion system to operate in a desired fashion, e.g., as specified by user applications executing on the motion controller and/or a computer coupled to the motion controller. For example, the output may include drive commands to drive a motor, e.g., where the first and/or second portion includes a motor.

Figure 7:
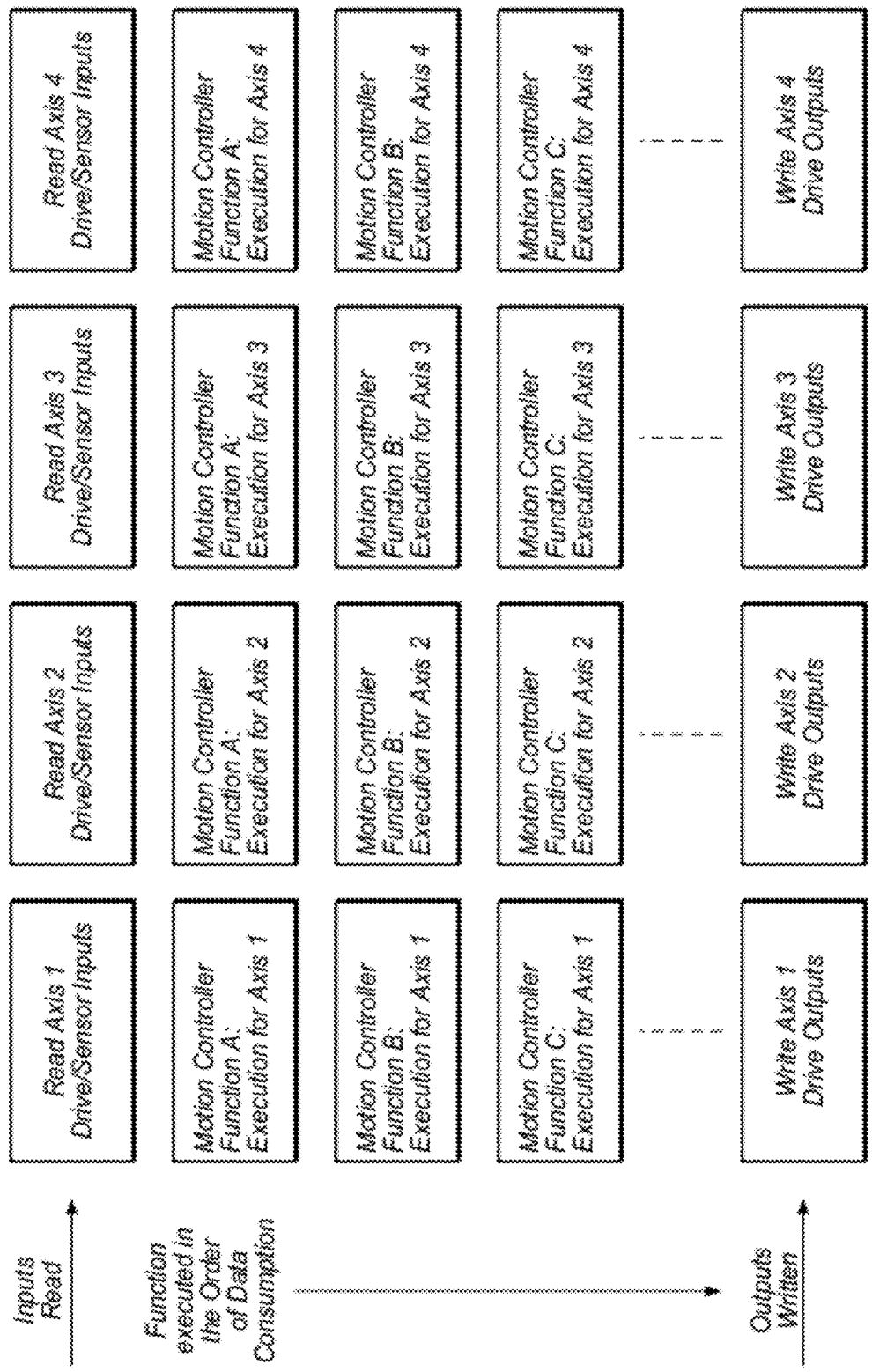
FIG. 7 is a block diagram illustrating an exemplary execution flow for a motion controller with a plurality of processors.

FIG. 7—Exemplary Execution Flow for a Motion Controller

FIG. 7 illustrates an example of a motion controller with four axes implemented on a processing chip with four cores. In this example, each function is provided full access to all the cores and the technology component uses all the cores to parallelize computation before relinquishing control to the next function in the sequence. In some embodiments, some of the functions may need to update a status or compute numerical data based on a combination of data from all of the axes and coordinates. In such a case, the function would complete such calculations before relinquishing control of all the cores to the next function in the sequence of functions. However, where such calculations are not required, it may be possible to allow processors to continue on to the next function when they complete rather than waiting for every axis to complete the function.

As shown, drive/sensor inputs are read for each different axis. Execution flows, for each processor, through each different function, shown generically as A, B, C, . . . . After the plurality of functions have been performed for each different axis, write data is provided to the drive outputs. Thus, FIG. 7 depicts an embodiment of execution flow for a motion controller with multiple processors controlling multiple portions of a motion system.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A non-transitory computer accessible memory medium storing program instructions for controlling a motion system using a multi-core processor, wherein the program instructions are executable to:
receive respective input data corresponding to each of a plurality of portions of the motion system;
assign execution of a sequence of functions to each processor core of a plurality of processor cores to determine respective outputs for the plurality of portions of the motion system based on the respective input data, wherein each portion of the motion system has an associated control axis comprising state information and algorithms used to execute the sequence of functions for the portion; and
provide the respective outputs to the plurality of portions of the motion system;
wherein the assignment of execution of the sequence of functions to each of the plurality of processor cores causes each of the processor cores to execute the sequence of functions in parallel, and wherein execution of each respective function in the sequence of functions by each of the processor cores is completed before execution of a next function of the sequence of functions is begun.

2. The non-transitory computer accessible memory medium of claim 1, wherein the plurality of portions of the motion system is greater in number than the plurality of processor cores, resulting in one or more additional portions, wherein to assign execution of the sequence of functions to each processor core, the program instructions are executable to:
assign an additional execution of the sequence of functions to each of a corresponding one or more of the plurality of processor cores to determine respective outputs for the one or more additional portions of the motion system based on the respective input data.

3. The non-transitory computer accessible memory medium of claim 1, wherein the plurality of sequential functions comprises at least one function for generating a trajectory for a respective portion of the motion system.

4. The non-transitory computer accessible memory medium of claim 3, wherein the plurality of sequential functions comprises at least one function for generating a setpoint based on the trajectory for the respective portion of the motion system.

5. The non-transitory computer accessible memory medium of claim 4, wherein the output for the respective portion is based on the setpoint.

6. The non-transitory computer accessible memory medium of claim 1, wherein the sequence of functions comprises at least one function for determining state information of the respective portion to determine if there is an error for the respective portion.

7. The non-transitory computer accessible memory medium of claim 1, wherein a first portion of the motion system comprises a first device, and wherein the output for the first portion comprises a drive command for the first device.

8. The non-transitory computer accessible memory medium of claim 1, wherein at least some of the portions of the motion system comprise respective devices, and wherein the output for the at least some portions comprises a drive command for each of the devices.

9. A method for controlling a motion system using a multi-core processor, comprising:
receiving respective input data corresponding to each of a plurality of portions of the motion system;
assigning execution of a sequence of functions to each processor core of a plurality of processor cores to determine respective outputs for the plurality of portions of the motion system based on the respective input data, wherein each portion of the motion system has an associated control axis comprising state information and algorithms used to execute the sequence of functions for the portion; and
providing the respective outputs to the plurality of portions of the motion system;
wherein said assigning execution of the sequence of functions to each of the plurality of processor cores causes each of the processor cores to execute the sequence of functions in parallel, and wherein execution of each respective function in the sequence of functions by each of the processor cores is completed before execution of a next function of the sequence of functions is begun.

10. The method of claim 9, wherein the plurality of portions of the motion system is greater in number than the plurality of processor cores, resulting in one or more additional portions, wherein said assigning execution of the sequence of functions to each processor core comprises:
assigning an additional execution of the sequence of functions to each of a corresponding one or more of the plurality of processor cores to determine respective outputs for the one or more additional portions of the motion system based on the respective input data.

11. The method of claim 9, wherein the plurality of sequential functions comprises at least one function for generating a trajectory for the respective portion of the motion system.

12. The method of claim 11, wherein the plurality of sequential functions comprises at least one function for generating a setpoint based on the trajectory for the respective portion of the motion system.

13. The method of claim 12, wherein the output for the respective portion is based on the setpoint.

14. The method of claim 9, wherein the sequence of functions comprises at least one function for determining state information of the respective device to determine if there is an error for the respective portion.

15. The method of claim 9, wherein a first portion of the motion system comprises a first device, wherein the output for the first portion comprises a drive command for the first device.

16. A system, comprising:
a processor, comprising a plurality of processor cores;
a plurality of inputs coupled to a plurality of devices and the plurality of processor cores;

a plurality of outputs coupled to the plurality of devices and the plurality of processor cores;
wherein the system is configured to:
receive respective input data corresponding to each of a plurality of devices;
assign execution of a sequence of functions to each processor core of a plurality of processor cores to determine respective outputs for the plurality of devices based on the respective input data, wherein each device has an associated control axis comprising state information and algorithms used to execute the sequence of functions for the device; and
provide the respective outputs to the plurality of devices;
wherein the assignment of execution of the sequence of functions to each of the plurality of processor cores causes each of the processor cores to execute the sequence of functions in parallel, and wherein execution of each respective function in the sequence of functions by each of the processor cores is completed before execution of a next function of the sequence of functions is begun.

17. The system of claim 16, wherein the plurality of devices of the system is greater in number than the plurality of processor cores, resulting in one or more additional devices, wherein to assign execution of the sequence of functions to each processor core, the system is configured to:
assign an additional execution of the sequence of functions to each of a corresponding one or more of the plurality of processor cores to determine respective outputs for the one or more additional devices of the system based on the respective input data.

18. The system of claim 16, wherein the plurality of sequential functions comprises at least one function for generating a trajectory for a respective device of the system.

19. The system of claim 18, wherein the plurality of sequential functions comprises at least one function for generating a setpoint based on the trajectory for the respective device of the system.

20. The system of claim 19, wherein the output for the respective device is based on the setpoint.

* * * * *